Patented Oct. 7, 1941

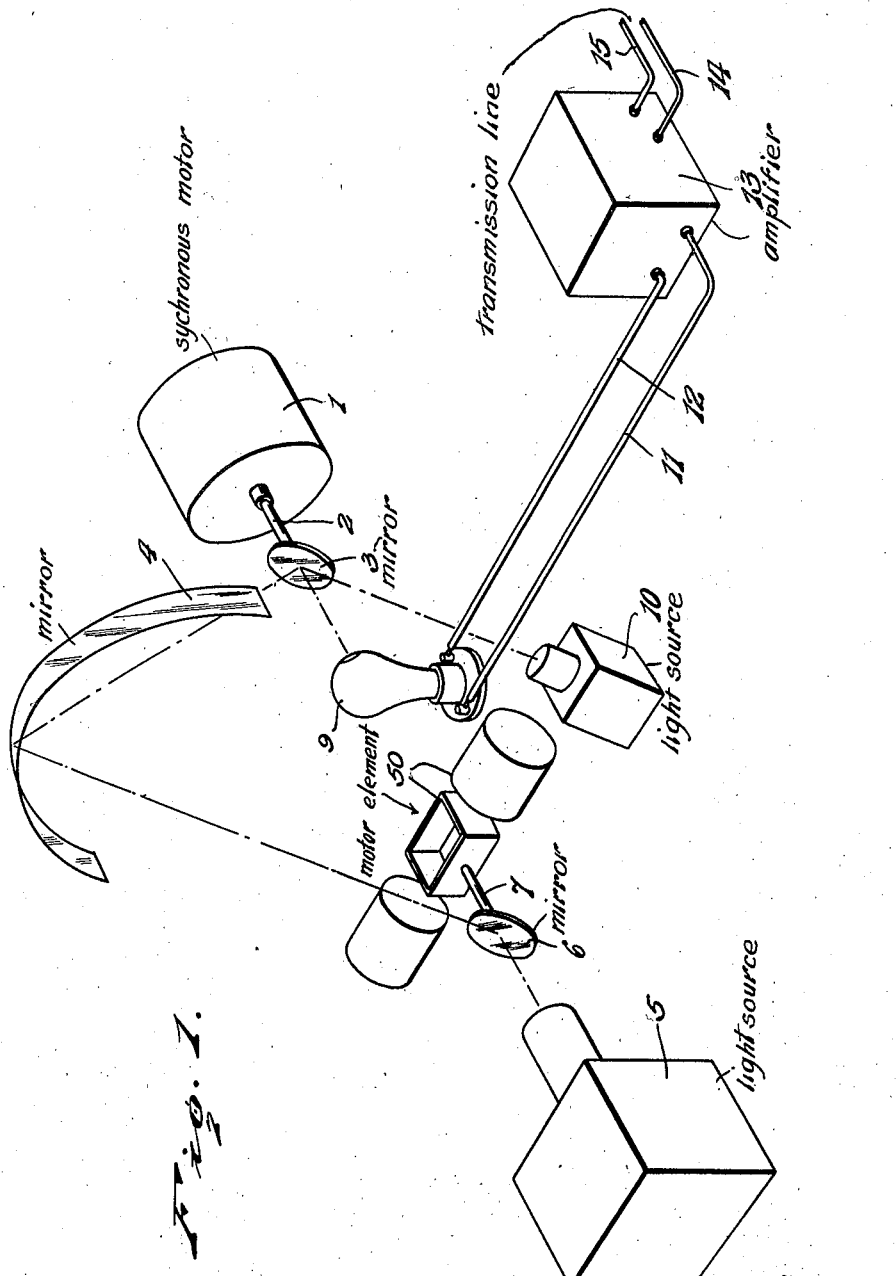

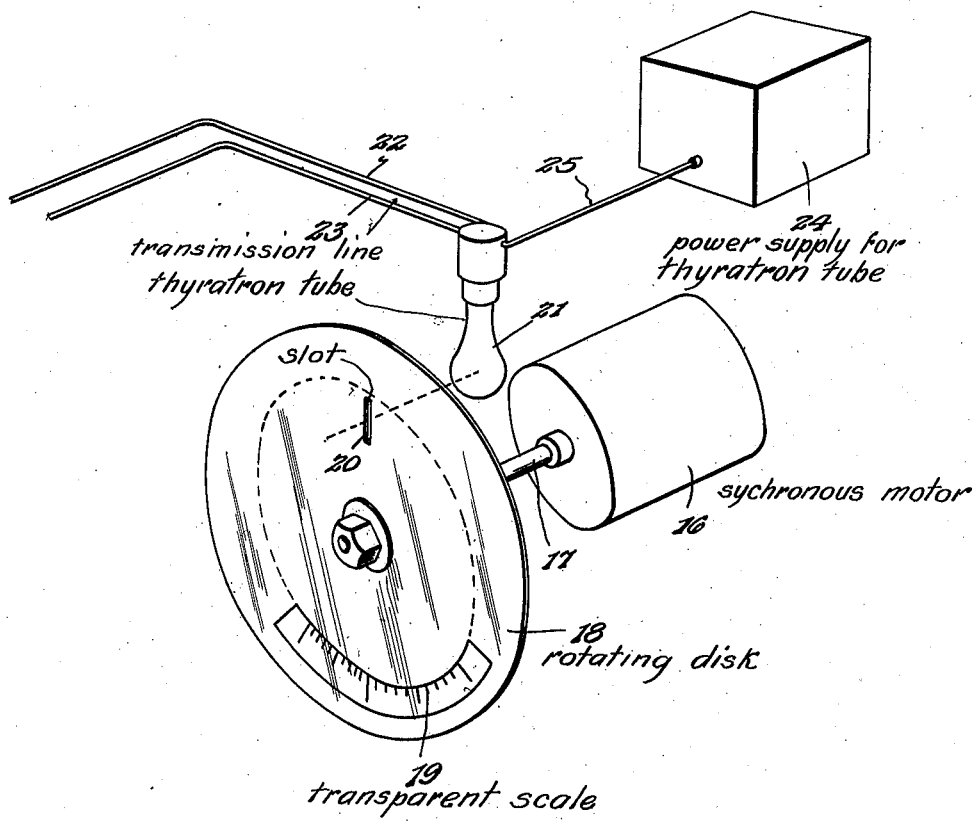

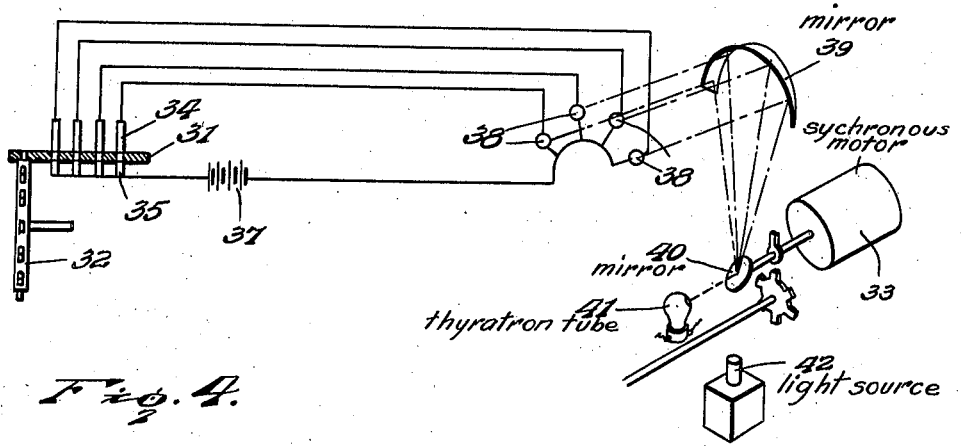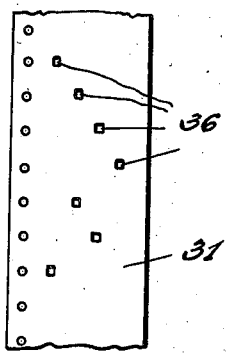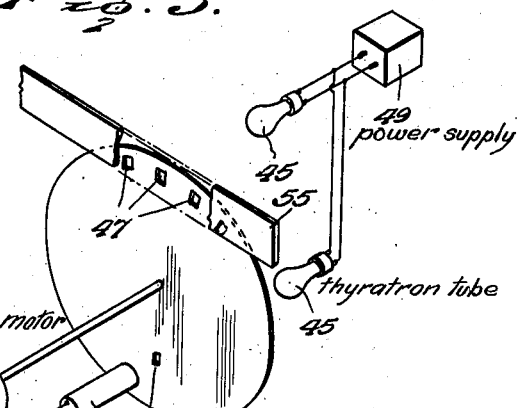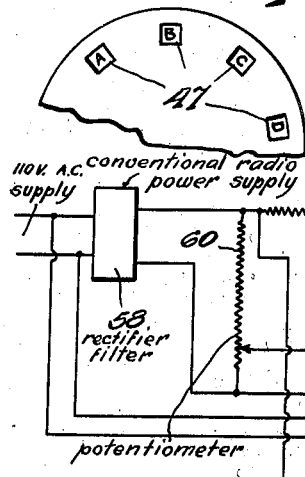

2,257,763

UNITED STATES PATENT OFFICE 2,257,763

REMOTE METERING AND POSITION INDICATOR

Gustav E. Petterson, Hillside, N. J.

Application June 22, 1936, Serial No. 86,665

1 Claim. (Cl. 177—327)

This invention relates to an improved remote metering and position indicating system and is particularly adapted for measuring electric quantities and indicating relative positions of apparatus such as flood gates, etc., at points distant from the place where the readings are desired.

In systems now in use for accomplishing the above, a common fault exists. That is the need that transmission line leakage be constant for correct indication. There are two systems in use which do not possess this disadvantage, but these two, namely: the variable frequency system and the impulse system, possess other disadvantages, one of which is that they both cause interference in telephone circuits in the vicinity. Moreover, the impulse system is slow in operation and the variable frequency system will not operate without the use of a base frequency.

One object of the present invention, therefore, is to provide a remote metering and position indicating system which will be independent of resistance, leakage, inductance, and capacity in the line.

Another object of the invention is to provide a remote metering and position indicating system which will operate without causing interference in telephone circuits and radio receiving sets in the vicinity.

A further object of the invention is to provide a system of this character which may be adapted for use with various types of indication and which will operate with equal efficiency with any length of transmission line.

A further object of the invention is to provide a remote metering and position indicating system which may be used for carrier current transmission and other high frequency work.

A still further object of the invention is to provide a remote metering and position indicating system which will be capable of high speed operation.

And a still further object of the invention is to provide a remote metering and position indicating system employing apparatus of rugged construction so that maintenance costs will be kept low and need for calibrations from time to time will be obviated.

Other and incidental objects of the invention, not specifically mentioned in the foregoing, will render themselves apparent as the description of said invention proceeds.

In the drawings forming a part of my invention:

Figure 1 is a diagrammatic perspective view of the transmission unit forming a part of my remote metering and position indicating system.

Figure 2 is a diagrammatic perspective view showing the receiving unit employed.

Figure 3 is a diagrammatic view showing a form of my invention to be used as a telegraph transmitter.

Figure 4 is a fragmentary top plan view of a portion of tape used with the form of the invention shown in Figure 3.

Figure 5 is a detail perspective view, partly shown diagrammatically, of a receiving unit to be employed in conjunction with the invention as shown in Figure 3.

Figure 6 is a diagrammatic view showing the wiring diagram of the thyratron tube employed.

Figure 7 is a fragmentary plan view of the disc employed with the receiving unit shown in Figure 5.

In carrying my invention into effect, I employ, preferably, separate units for each system, one of which is a transmitter unit while the other is a receiver unit. I will first describe in detail the transmitter unit, which is illustrated diagrammatically in Figure 1 of the drawings. The transmitter unit includes a synchronous electric motor 1 which is provided with an armature 2. The armature carries a small mirror 3 which is set at an angle to the shaft so that rotation of said mirror will break a beam of light into intermittent flashes in a manner to be described more fully hereinafter.

Associated with the motor 1, armature 2 and mirror 3, is an arcuate mirror 4 forming part of an optical system for transmission of a light beam. A light source 5 is provided, and a small mirror 6, which is set on a shaft 7 in a manner similar to the setting of the mirror 3, is also provided. The shaft 7 is adapted to rotate, and rotation of said shaft is controlled by the source supply to be measured.

A second light source is shown at 10 and this light source is adapted to reflect a beam for projection by the mirror 3 to the photo-electric cell 9. The photo-electric cell is electrically connected by conductors 11 and 12 to a thermionic amplifier 13. The amplifier is of conventional construction and may comprise any suitable number of stages of amplification. Conductors 14 and 15 connect the output of the amplifier to a transmission line.

The operation of the transmitter unit is as follows: The beam of light from the light source 5 is reflected from the mirror 6, which is carried by the shaft 7, the position of which is governed by a device 50 such as a voltmeter or ammeter element, or the moving element of a frequency meter or phase angle indicator or any other apparatus which position it is desired to ascertain at a remote point. An electric meter element is shown. The beam is projected from said mirror 6 to the arcuate mirror 4, and from said arcuate mirror 4 to the mirror 3, and from said mirror 3 the beam is projected to the photo-electric cell 9. The light source 10 projects a beam to the mirror 3 and to the photo-electric cell 9. It will be understood that the last mentioned beam will only be projected by the mirror 3 when the reflecting surface of said mirror is downward. In other words, the beam from the light source 5 will be reflected by the mirror 3 to the photo-electric cell 9 when the reflecting surface of said mirror is in an angular position corresponding to the angular position of the mirror 6. The beam from the light source 10 will be reflected to the photo-electric cell when the reflecting surface of the mirror 3 is perpendicular to a vertical plane through the center line of the motor 1 and facing downward. Rotation of the mirror 3 will, therefore, produce electrical impulses in the photo-electric cell circuit and these impulses are amplified by the thermionic amplifier 13 and are transmitted to the transmission line by means of the conductors 14 and 15. The amplifier 13 may, as stated, include any suitable number of stages of amplification.

The receiver unit of my system is shown in Figure 2 of the drawings and, like the transmitter unit, includes a synchronous motor. The motor is indicated at 16 and includes an armature 17 which is adapted to rotate in synchronism with the armature 2 of the motor 1 in the transmitter unit. The motors 1 and 16 are connected to the same power line and, accordingly, absolute synchronism of rotation of the shaft 2 and 17 will take place. For convenience the power transmission lines are shown at 100 and 101.

Carried on the shaft 17 at its free end is a disc 18 which is provided with an arcuate scale 19 near its circumferential edge. The scale extends substantially one-fourth of the circumference of the disc 18. The width of the scale depends, of course, on the magnitude of the angular movement possible of the shaft 7, Figure 1, and formed in said disc diametrically opposite the mid-point of the scale 19 is a radially disposed relatively short slot 20. A thyratron tube 21 is mounted between the disc 18 and the motor 16 in such a manner that light from said tube will be visible through the slot and the scale as the disc is rotated. Any other type of gas discharge tube may be substituted for the thyratron tube, if desired. The transmission line is connected to the thyratron tube by means of conductors 22 and 23. A power supply unit is shown at 24 and this power supply unit is connected to the thyratron tube by means of a cable 25. The power supply unit 24 provides filament and plate supply for the tube 21, and the wiring diagram for said thyratron tube is shown in Figure 6. The thyratron tube is connected in the circuits in such a manner that a condenser, in the circuit and assumed to be mounted inside the power supply unit 24, can discharge through the tube when the grid of the tube is energized by the impulse received from the transmitting station over the line. The circuit connections between the condenser and the tube 21 are, for convenience, shown in Figure 6, and are such that the condenser will be re-charged in the intervals between the impulses coming in through the power line through the conductors 22 and 23. Such discharge circuits are commonly used in connection with stroboscopic apparatus.

A further discussion of the operation of the receiver unit follows: When the mirror 3 in the transmitter unit is in a position to reflect the light beam from the light source 10 to the photo-electric cell 9 and the two motors are in exact synchronism, the mid-point of the scale will be on the upper half of a vertical diameter through the disc. When the mirror 3 is in an angular position corresponding to the angular position of the mirror 6, the light beam from the light source 5 will be reflected to the photo-electric cell 9 as explained above, and the impulse thereby sent over the transmission line will cause the condenser to discharge through the thyratron tube 21 when the rotating mirror 3 reaches this position. Since the motors 1 and 16 are in synchronism, the disc 18 of the receiver unit will simultaneously be in such a position that light from the thyratron tube 21 will be seen through the slot 20, and the relative position of said slot 20 and the scale 19 will depend upon the magnitude of the quantity to be measured at the time. It is understood that because of the fact that an eye retains an impression of a picture for some time after the picture has disappeared, and because of the fact that the light impulses in the herein described apparatus reoccur at very short intervals, the picture of the slot and the scale will appear to the eye as being continuous and simultaneous. These facts are commonly known and utilized in the art of stroboscopic apparatus. Although it has been stated hereinbefore, that the motors 1 and 16 are energized from the same power line in order to insure synchronism, it should be understood that, as the indications at the receiver unit are dependent upon the relative position of the scale 19 and slot 20 only, the accuracy is not dependent upon the motors being in exact synchronism or upon the characteristics of the transmission line being constant. Therefore, if two motors, driven by independent power sources, run at substantially the same speed, the speed being maintained substantially equal by piezoelectric crystals, forks, or other such equipment, the indications on the disc will remain accurate. Variation in speed between the motors will cause the scale and slot to appear to be slowly traveling around the disc 18.

It will be understood, by the use of my improved metering system, meter indications may be taken at the receiver unit and these indications will not be affected by changes in line resistance, introductance, capacity, leakage, or other characteristics. The system is characterized by the utmost simplicty in operation and, as ruggedly built parts may be employed, the transmitter and receiver units will retain calibration over long periods of time without attention.

Some of the applications of my invention, aside from direct meter indications, will now be set forth, as follows:

A number of different indications may be obtained by employing four different meters or indicators which are connected by switches so as to turn off and on once every fourth revolution of a 3600 per minute R. P. M. motor. By using carrier current, the number of indications that can be had simultaneously is four times the number of the carrier channels. The number of indications can be greatly increased by modulating the carrier currents in these channels by low frequency oscillators.

An oscillographic record, on a photographic film, can be taken at the receiving end provided the mirror element of an oscillograph or a cathode ray tube is substituted for the optical arrangement shown in Figure 1 of the drawings. The record obtained will be in the form of a series of dots which can be joined by a line to form a curve. The use of the oscillograph is well known for checking modulation of radio telephone transmitters.

My system also lends itself well for use in supervisory indications of oil circuit breaker positions and the like in outlying stations. This can be done by mounting small lamps, controlled by auxiliary switches, on the apparatus to be supervised behind a slotted disc at the transmitter unit and allowing the light from these lamps to operate a photo-electric cell through the slotted disc. The electrical impulses obtained in this manner are amplified by the thermionic amplifier 13 and are sent over the transmission line to the receiver unit where they operate the thyratron tube 21 in the manner previously described. A panel for a single line diagram is mounted in front of the disc 18 so that light from the thyratron tube will be seen when the slot is passing an opening in the panel corresponding to a closed oil circuit breaker in the outlying station.

As a normal eye retains a picture for approximately one fifteenth of a second, four different indications may be obtained over the same transmission line when using 3600 R. P. M. motors if a rotating switch is arranged to switch four different motors on and off every fourth revolution. This method of obtaining several indications simultaneously is well known in the art of cathode-ray oscilloscopes, when oscillograms showing the wave shapes of several different sources are sometimes obtained by arranging a rotary switch to switch the different sources on and off several times per second. As stated by using carrier current the number of indications that can be had simultaneously is four times the number of the carrier channels. Indications can be greatly increased by modulating carrier currents by low frequency oscillators. The several different sending apparatus are then arranged to send out their respective impulses as modulated carrier current impulses, the modulation frequency being different for each sending apparatus. The receiving apparatus are arranged to select the different frequencies by tuned filters. This method of sending different signals over the same channel is well known in the art of carrier current telephony. An oscillographic record on a photographic film can be obtained at the receiving end by letting the position of the mirror 6 be controlled by an oscillograph element. The speed of the motors 1 and 16 will then have to be increased if the frequency of the source to be measured is very great. The use of the oscillograph is well known for studying wave shapes, etc., of alternating current sources.

With slight modification, my improved system may be employed for repeater compasses controlled by a gyro master compass so that the slave gear now commonly used may be eliminated. By letting the position of the mirror 6 be governed by a gyro master compass, compass readings can be obtained at locations on a ship remote from the location where the gyro master compass is installed.

If the sending apparatus is mounted on a gyroscope, so as always to be in a fixed position relative to the horizontal, and the apparatus is so arranged that the mirror 3 will rotate in a vertical plane through the center of the mirror and the sun, the light from the sun will, of course, be reflected to the photo electric cell 9 when the reflecting surface of the rotating mirror 3 is facing the sun. An indication will then be obtained at the receiving apparatus of the angle between the horizontal and a line going through the center of the mirror 3 and the center of the sun. The elevation of the sun can then be obtained without the necessity of following the sun with a sextant, as is now common practice. If the photo electric cell 9 is of such construction as to be sensitive to infra red radiation, an indication can be obtained even in cloudy or foggy weather.

By changing the position of the apparatus so that the mirror 3 rotates in a horizontal plane, and letting the position of the light source 10 be governed by a compass, an indication of the sun's azimuth angle can, of course, be obtained. For this use of my apparatus, the mirror 6, the arcuate mirror 4, the apparatus 50, and the light source 5, should, of course, be removed.

My system also lends itself well for use in high speed telegraphy. The apparatus is then arranged as shown in Figures 3 and 5, where 31 represents a tape of insulating material perforated on one or both edges in a similar manner as moving picture film is perforated. The numeral 32 indicates a sprocket wheel for moving said tape. This sprocket wheel is so arranged that it rotates the distance of one tooth for each revolution of the motor 33. This can be accomplished for instance by means shown in the figures referred to. Sliding on the tape are contacts 34 and 35. These contacts are normally insulated from each other by the tape 31. The center portion of the tape is also perforated, the location of the perforations being governed by the letters which it is desired to transmit. This perforation 36 (Figure 4) is made before the tape is inserted in the apparatus, in a manner similar to the perforations on the tapes now commonly used for high speed telegraphy. When one of these holes is located between one of the upper and lower contacts 34 and 35 a circuit is completed from a battery 37 through said contacts 34 and 35 through one of the light sources 38 and back to the battery. The light from the light source 38 is then reflected by the conical arcuate mirror 39 to the rotating mirror 40. When the reflecting surface of the mirror 40 is facing the spot of the conical arcuate mirror 39 from which the light coming from the light source 38 is being reflected, the mirror 40 will reflect the light to the photoelectric cell 41. This photoelectric cell will then send out an electric impulse over the transmitting circuit to the receiving station in the same manner as before described. An impulse is also sent out over the transmitting circuit when the reflecting surfaces of the rotating mirror 40 is perpendicular to the light beam coming from the light source 42.

At the receiving end, as shown in Figure 5, a disc 43 is being rotated by a motor 44. Behind this disc are arranged two thyratron tubes 45. In the disc there are several slots 47 and 48. The slot 48 will admit light from the lower thyratron tube 45 to the device 46. This device consists of a follow-up apparatus, for instance, similar to the apparatus described by B. A. Wittkuhns in his Patent 1,976,648, a Remote control system. This device 46 serves to keep the motor 44 in synchronism with the motor 33 and the disc 43 in such an angular position as to admit light from the lower thyratron tube 45 to the device 46 when the mirror 40 is in an angular position to reflect light from the light source 42 to the photoelectric cell 41. On the disc 43 there are other slots 47 located nearer the edge of the disc, as shown in Figure 7. In these slots there are inserted transparent films with opaque letters and numerals. The upper thyratron tube 45 is so located that light from it can be transmitted through the transparent slots 47 to a photographic tape 55 in front of the disc. This tape is moving in front of the disc, and the speed of the movement is governed by the speed of the motors 33 and 44.

When the apparatus is set in motion, the beam from the light source 42 is reflected by the mirror 40 to the photoelectric cell 41 and an impulse is transmitted over the transmission line to the condenser circuit 49 at the receiving end, each time the mirror 40 passes a certain position. The condenser 49 discharges into the tubes 45, and the light from the lower thyratron tube passes through the slot 48 to the governing apparatus 46 if the slot is between the thyratron tube and the governing apparatus 46 at this instant. If the slot should happen to be in another position at this instant, the frame of the motor is turned by hand until the light is admitted to the apparatus 46. When this is done the motor 44 will automatically be kept in synchronism with the motor 33 by virtue of the characteristics of the apparatus 46.

When the tape 31 at the sending apparatus is inserted it is moved one step at a time as explained above. While this tape 31 is standing still, the light sources 38 are scanned by the mirror 40. One of these light sources is then energized as explained above. When the mirror 40 passes a position where the light from the energized light source is reflected to the photoelectric cell 41, an impulse is sent out to the receiving apparatus and the thyratron tubes 45 flash. At the same instant, the rotating disc 43 is in such position that the slot 47, which has a stencil corresponding to the light source 38, is located between the upper thyratron tube 45 and the photographic tape 55, and a print of the letter stenciled in this slot is obtained on said tape. Then, when the mirror 40 continues to rotate, it will again reach a position where the light beam from the light source 42 is reflected to the photoelectric cell 41 and another synchronizing impulse is received at the receiving end. At the same time, the tape 31 is stepped along so that the next slot is between the upper and lower contacts 34 and 35. This will again energize one of the light sources 38. The one to be energized will, of course, depend on the location of the slot in question on the tape 31. The mirror 40 will then again scan the light sources 38 and another light impulse will be transmitted to the receiving unit. Meanwhile, the tape 55 will also have been moved one step, and another imprint will be obtained on this tape corresponding to the light source energized at the transmitting end.

A complete message can in this manner be transmitted and only one impulse is necessary for each letter, as compared to from one to five or more impulses in the systems now in use. Only four letters are shown in Figure 7, although any suitable number may be used.

The conventional connections of the thyratron tubes 21 and 45, one of such tubes being illustrated for sake of simplicity, are shown in Figure 6. The circuit employed is often used in stroboscopic work. A conventional radio power supply 58 supplies the plate current to the thyratron tube while a filament transformer 59 heats the filament in a conventional manner. Suitable resistors 60, 61, 62 and 63 are employed for regulating grid bias and plate current supplied to the thyratron tube.

The operation of the circuit shown in Figure 6 is as follows: The condenser 49 is charged from the transmission line, placing the voltage of transmission line between the anode $a$ and the cathode $c$ of the thyratron tube. Due to the conditions of voltage and bias upon the tube, break down will not take place. More specifically, the power supply 58 will supply anode current for the anode $a$ of the thyratron and the grid of said thyratron will be biased from the power supply 58 through the resistance 60 and the resistances 62 and 63. An incoming impulse on the transmission line will raise the grid voltage with respect to the cathode with the result that a discharge takes place between the anode and the cathode. The voltage across the tube will then be lowered and the discharge will stop. The condenser 49 will be automatically recharged by the power supply 58 between the discharges caused by impulses from the transmission line.

Having thus described the invention, what I claim is:

A receiver unit including a thyratron tube, a power supply therefor, said thyratron tube having a grid, an anode and a cathode, means connecting the anode and grid with an impulse source, a disk disposed adjacent the thyratron tube and having a radially disposed slot and an arcuate scale, said scale having a center line disposed diametrically opposite the longitudinal axis of the slot, the radius of a point on the slot being the same as that of a point on the scale, and a motor for rotating the disk, said thyratron being discharged by impulses from the impulse source for creating flashes of light visible through the slot and scale during rotation of the disk by the motor, the relative positions of the slot on the scale indicating current magnitude at a remote point.

GUSTAV E. PETTERSON.